United States Patent
Liu et al.

(10) Patent No.: US 11,080,510 B1
(45) Date of Patent: Aug. 3, 2021

(54) FINGERPRINT RECOGNITION APPARATUS AND METHOD THEREOF

(71) Applicant: Novatek Microelectronics Corp., Hsinchu (TW)

(72) Inventors: Chien-Chung Liu, Hsinchu (TW); Hsing-Lung Chung, Miaoli County (TW); Jou-Chia Chen, Yunlin County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/841,638

(22) Filed: Apr. 6, 2020

(51) Int. Cl.
*G06K 9/00* (2006.01)

(52) U.S. Cl.
CPC ....... *G06K 9/00087* (2013.01); *G06K 9/0004* (2013.01)

(58) Field of Classification Search
CPC .................. G06K 9/00087; G06K 9/0004
See application file for complete search history.

(56) References Cited

U.S. PATENT DOCUMENTS

| | | | |
|---|---|---|---|
| 2007/0211921 A1* | 9/2007 | Popp | G06K 9/0004 382/115 |
| 2020/0074142 A1* | 3/2020 | Yang | G06K 9/00087 |
| 2020/0320269 A1* | 10/2020 | Kim | G06F 3/0416 |

* cited by examiner

*Primary Examiner* — Stephen G Sherman
(74) *Attorney, Agent, or Firm* — JCIPRNET

(57) ABSTRACT

A fingerprint recognition apparatus with dynamically adjustable power levels of light-emitting modules is introduced, including: a touch detecting module detecting a touch coordinate and a touch area of a finger on a panel; a plurality of light-emitting modules emitting light to the finger on the panel; a processing module coupling to the touch detecting module and the plurality of light-emitting modules and outputting a setting value according to the touch coordinate, the touch area and positions of the plurality of light-emitting modules; a light-emitting power adjusting module adjusting power levels of the plurality of light-emitting modules according to the setting value; and an image outputting module outputting the fingerprint according to the fingerprint image.

16 Claims, 6 Drawing Sheets

US 11,080,510 B1

FINGERPRINT RECOGNITION APPARATUS AND METHOD THEREOF

BACKGROUND

Technical Field

The invention relates to a fingerprint recognition apparatus.

Description of Related Art

Optical fingerprint recognition under the screen is widely used recently. In order for non-self-luminous panels (such as liquid crystal display, LCD) to use fingerprint recognition functions, infrared (IR) is usually used for emitting light to the fingerprint. However, the user's fingerprint position has an impact on the success rate of the fingerprint recognition. The deviation of the fingerprint position increases the probability of the fingerprint recognition failure, for example, when the fingerprint is deviated from a position of the IR light module, the image of the fingerprint becomes dark and the fingerprint details disappear; when the fingerprint is deviated toward the position of the IR light module, the image of the fingerprint becomes overexposed and the fingerprint details disappear, both may cause the fingerprint recognition failure.

When the fingerprint area is too small to cover the IR light module, the amount of light reflected to the fingerprint sensor from the fingerprint is insufficient, which may cause the image of the fingerprint to be dark. When the fingerprint area fully covers the IR light module, the amount of light reflected to the fingerprint sensor from the fingerprint may be too much such that the image of the fingerprint is overexposed.

Nothing herein should be construed as an admission of knowledge in the prior art of any portion of the present disclosure.

SUMMARY

A fingerprint recognition apparatus with dynamically adjustable power levels of light-emitting modules according to a position of the fingerprint and a characteristic value of the fingerprint image is introduced to keep the details of the fingerprint with proper power levels of the light emitted to the fingerprint and enhance the recognition rate of the fingerprint.

In an embodiment of the disclosure, the fingerprint recognition apparatus includes a touch detecting module, configured to detect a touch coordinate of a finger on the panel and a touch area of the finger on the panel; a plurality of light-emitting modules, emitting light to the finger on the panel; a processing module, coupling to the touch detecting module and the plurality of light-emitting modules, and outputting a setting value according to the touch coordinate, the touch area and positions of the plurality of light-emitting modules; a light-emitting power adjusting module, coupling to the processing module and adjusting power levels of the plurality of light-emitting modules according to the setting value; and an image outputting module, coupling to the processing module and outputting the fingerprint image.

In an embodiment of the disclosure, a method adapted to the fingerprint recognition apparatus includes detecting a touch coordinate and a touch area of a finger on a panel; outputting a setting value according to the touch coordinate, the touch area and positions of a plurality of light-emitting modules; adjusting power levels of the light-emitting modules according to the setting value; and obtaining a fingerprint image captured on the panel.

To sum up, in the fingerprint recognition apparatus provided by the disclosure, the details of the fingerprint are kept by emitting proper power levels of the light from the IR light-emitting modules to the fingerprint dynamically according to the position of the fingerprint and the characteristic value of the fingerprint image and enhance the recognition rate of the fingerprint.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Embodiments of the disclosure are described hereinafter with reference to the drawings.

Figure 1:
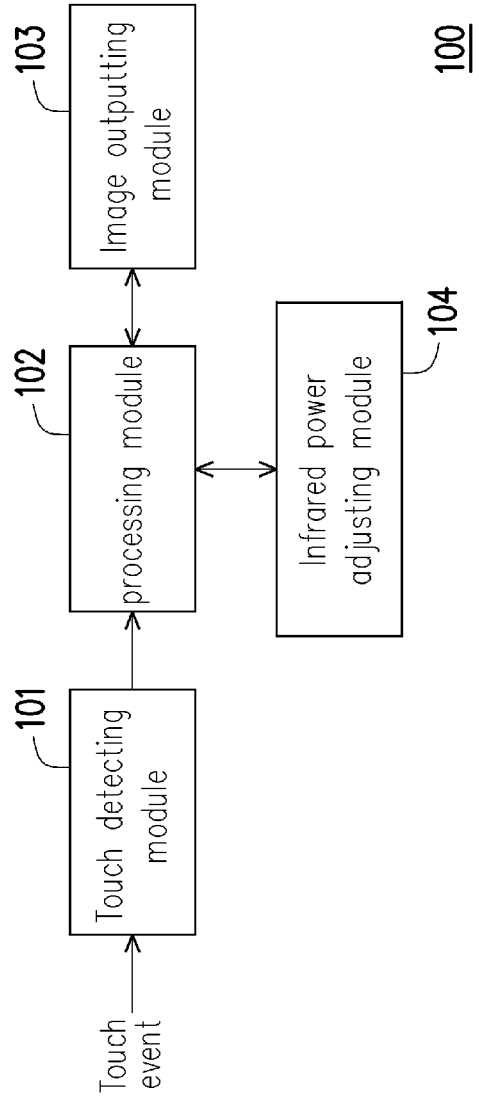
FIG. 1 is a system diagram of a fingerprint recognition apparatus according to an embodiment of the disclosure.

FIG. 1 is a system diagram of a fingerprint recognition apparatus according to an embodiment of the disclosure. The fingerprint recognition apparatus 100 includes a touch detecting module 101, a processing module 102, an image outputting module 103, an infrared power adjusting module 104, a panel (not shown in FIG. 1) and a plurality of infrared light-emitting modules (not shown in FIG. 1).

The panel obtains a fingerprint from a user. The touch detecting module 101 coupling to the panel detects a touch coordinate and a touch area of the fingerprint on the panel. The plurality of infrared light-emitting modules emit infrared light to the fingerprint on the panel. The processing module 102 coupling to the touch detecting module 101 and the plurality of infrared light-emitting modules obtains positions of the plurality of infrared light-emitting modules and outputs a setting value and a fingerprint image according to the touch coordinate and the touch area and the positions of the plurality of infrared light-emitting modules.

The infrared power adjusting module 104 coupling to the processing module 102 adjusts power levels of the plurality of infrared light-emitting modules according to the setting value. The image outputting module 103 coupling to the processing module 102 outputs the fingerprint according to the fingerprint image.

Figure 2:
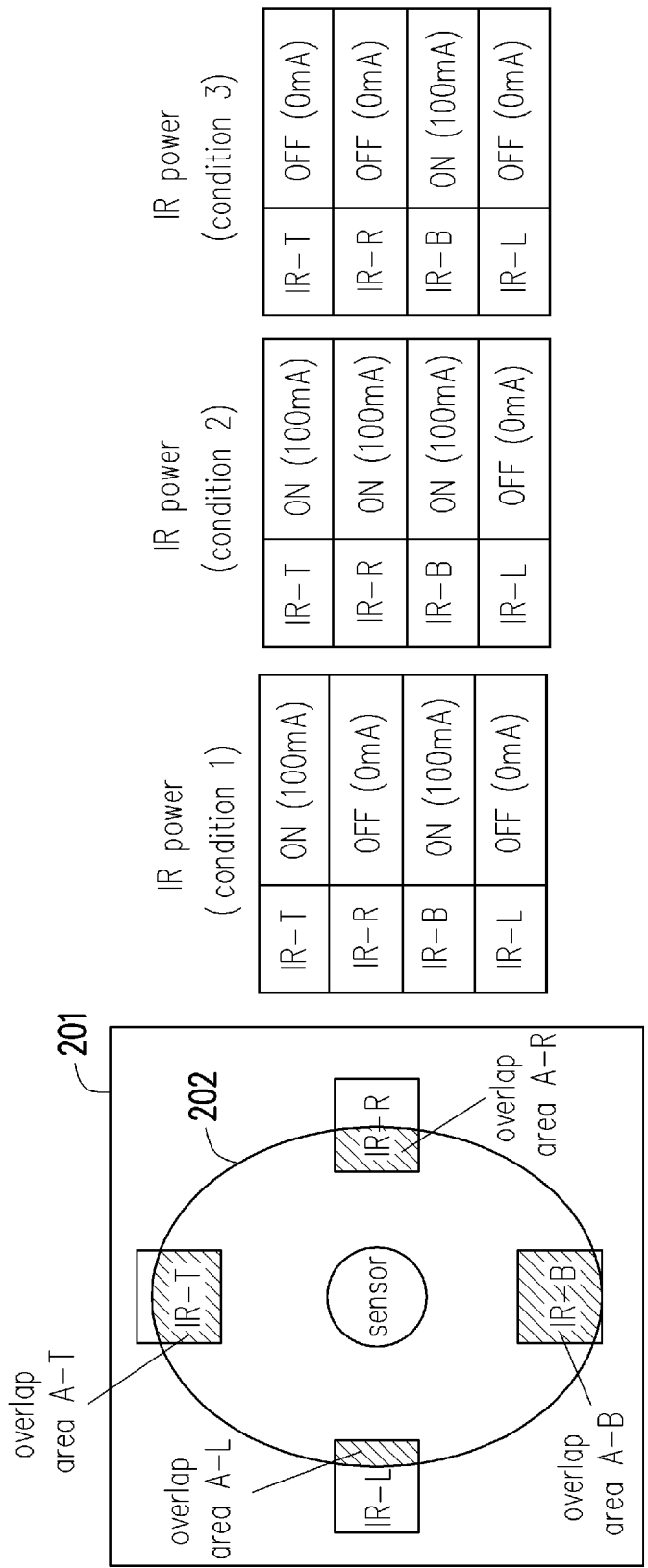
FIG. 2 is power levels of each of the IR light-emitting modules corresponding to overlap areas between a touch area on a panel and areas of each of the IR light-emitting modules on the panel according to an embodiment of the disclosure.

FIG. 2 is the power levels of each of the IR light-emitting modules corresponding to overlap areas (A-T, A-R, A-B, A-L) between a touch area 202 on the panel 201 and areas of each of the IR light-emitting modules (IR-T, IR-R, IR-B, IR-L) on the panel 201 according to an embodiment of the disclosure.

The processing module 102 outputs the setting values to the infrared power adjusting module 104 to adjust the power levels of each of the IR light-emitting modules (IR-T, IR-R, IR-B, IR-L) according to the overlap areas (A-T, A-R, A-B, A-L). For examples, the processing module 102 outputs the setting values to the infrared power adjusting module 104 to adjust the IR light-emitting modules (IR-T, IR-R, IR-B) to a first power level 100 mA (ON) or a second power level 0 mA (OFF) when the overlap areas (A-T, A-R, A-B) is equal to or greater than a threshold value, and to adjust the IR light-emitting module (IR-L) to the second power level 0 mA (OFF) when the overlap area (A-L) is less than the threshold value.

For example, as shown in FIG. 1 and FIG. 2 the infrared power adjusting module 104 adjusts the IR light-emitting modules (IR-T, IR-B) to the first power level 100 mA (ON) and adjusts the IR light-emitting modules (IR-R, IR-L) to the second power level 0 mA (OFF) under IR power condition 1. The processing module 102 transmits a fingerprint capture signal to a fingerprint sensor (not shown in FIG. 1) to capture the fingerprint under IR power condition 1.

The processing module 102 outputs a captured fingerprint image under IR power condition 1 to the image outputting module 103, and the image outputting module 103 outputs the fingerprint when a characteristic value of the fingerprint image, for example a grayscale value, is within a first range and outputs a re-adjust signal to the processing module 102 to update the setting values to IR power condition 2 or IR power condition 3 when the characteristic value of the fingerprint image is not within the first range.

For example, the image outputting module 103 outputs the re-adjust signal to the processing module 102 to update the setting values from IR power condition 1 to IR power condition 2 when the grayscale value of the fingerprint image is less than the first range, and to update the setting values from IR power condition 1 to IR power condition 3 when the grayscale value of the fingerprint image is greater than the first range, and the processing module 102 transmits the fingerprint capture signal to the fingerprint sensor to capture the fingerprint after the IR power condition is updated.

Figure 3:
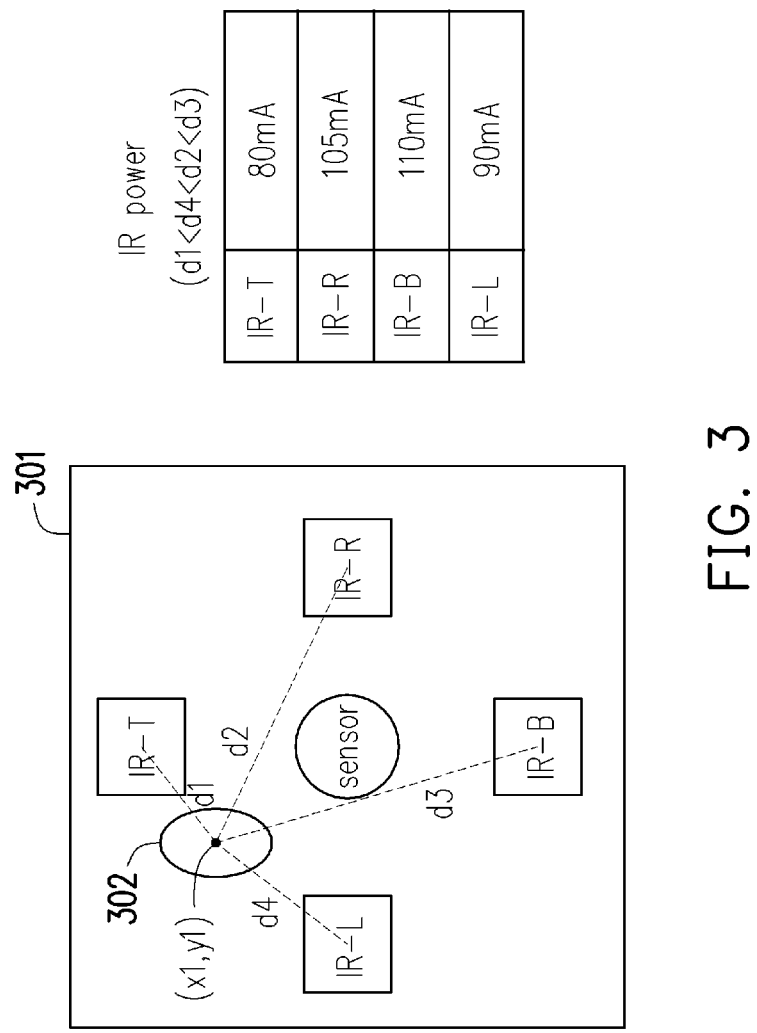
FIG. 3 is power levels of each of the IR light-emitting modules corresponding to relative distances from a first touch coordinate on the panel to coordinates of each of the IR light modules on the panel according to an embodiment of the disclosure.

FIG. 3 is the power levels of each of the IR light-emitting modules corresponding to relative distances (d1, d2, d3, d4) from a first touch coordinate (x1,y1) on the panel 301 to coordinates of each of the IR light-emitting modules (IR-T, IR-R, IR-B, IR-L) on the panel 301 according to an embodiment of the disclosure.

The processing module 102 coupling to the touch detecting module 101 and each of the IR light-emitting modules (IR-T, IR-R, IR-B, IR-L) obtains the coordinates of each of the IR light-emitting modules (IR-T, IR-R, IR-B, IR-L) on the panel 301. The processing module 102 outputs the setting values to the infrared power adjusting module 104 to adjust the power levels of each of the IR light-emitting modules (IR-T, IR-R, IR-B, IR-L) according to the relative distances (d1, d2, d3, d4) from the first touch coordinate (x1,y1) to the coordinates of each of the IR light-emitting modules (IR-T, IR-R, IR-B, IR-L) on the panel 301, and d1<d4<d2<d3. For examples, the processing module 102 outputs the setting values to the infrared power adjusting module 104 to adjust the IR light-emitting modules (IR-T, IR-R, IR-B, IR-L) to IR power levels (80 mA, 105 mA, 110 mA, 90 mA), which are proportional to the relative distances (d1, d2, d3, d4) respectively.

Figure 4:
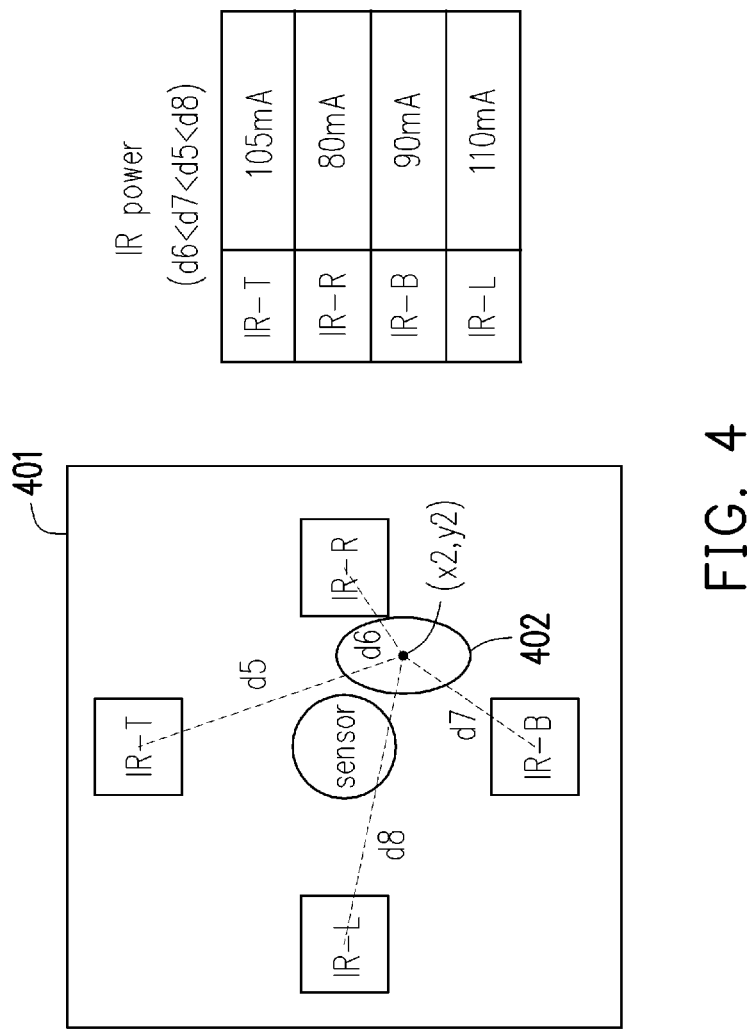
FIG. 4 is power levels of each of the IR light-emitting modules corresponding to relative distances from a second fingerprint coordinate on the panel to coordinates of each of the IR light modules on the panel according to another embodiment of the disclosure.

FIG. 4 is the power levels of each of the IR light-emitting modules corresponding to relative distances (d5, d6, d7, d8) from a second fingerprint coordinate (x2,y2) on the panel 401 to coordinates of each of the IR light-emitting modules (IR-T, IR-R, IR-B, IR-L) on the panel 401 according to an embodiment of the disclosure.

The processing module 102 coupling to the touch detecting module 101 and each of the IR light-emitting modules (IR-T, IR-R, IR-B, IR-L) obtains the coordinates of each of the IR light-emitting modules (IR-T, IR-R, IR-B, IR-L) on the panel 401. The processing module 102 outputs the setting values to the infrared power adjusting module 104 to adjust the power levels of each of the IR light-emitting modules (IR-T, IR-R, IR-B, IR-L) according to the relative distances (d5, d6, d7, d8) from the second fingerprint coordinate (x2,y2) to the coordinates of each of the IR light-emitting modules (IR-T, IR-R, IR-B, IR-L) on the panel 401, and d6<d7<d5<d8. For examples, the processing module 102 outputs the setting values to the infrared power adjusting module 104 to adjust the IR light-emitting modules (IR-T, IR-R, IR-B, IR-L) to IR power levels (105 mA, 80 mA, 90 mA, 110 mA), which are proportional to the relative distances (d5, d6, d7, d8) respectively.

Figure 5:
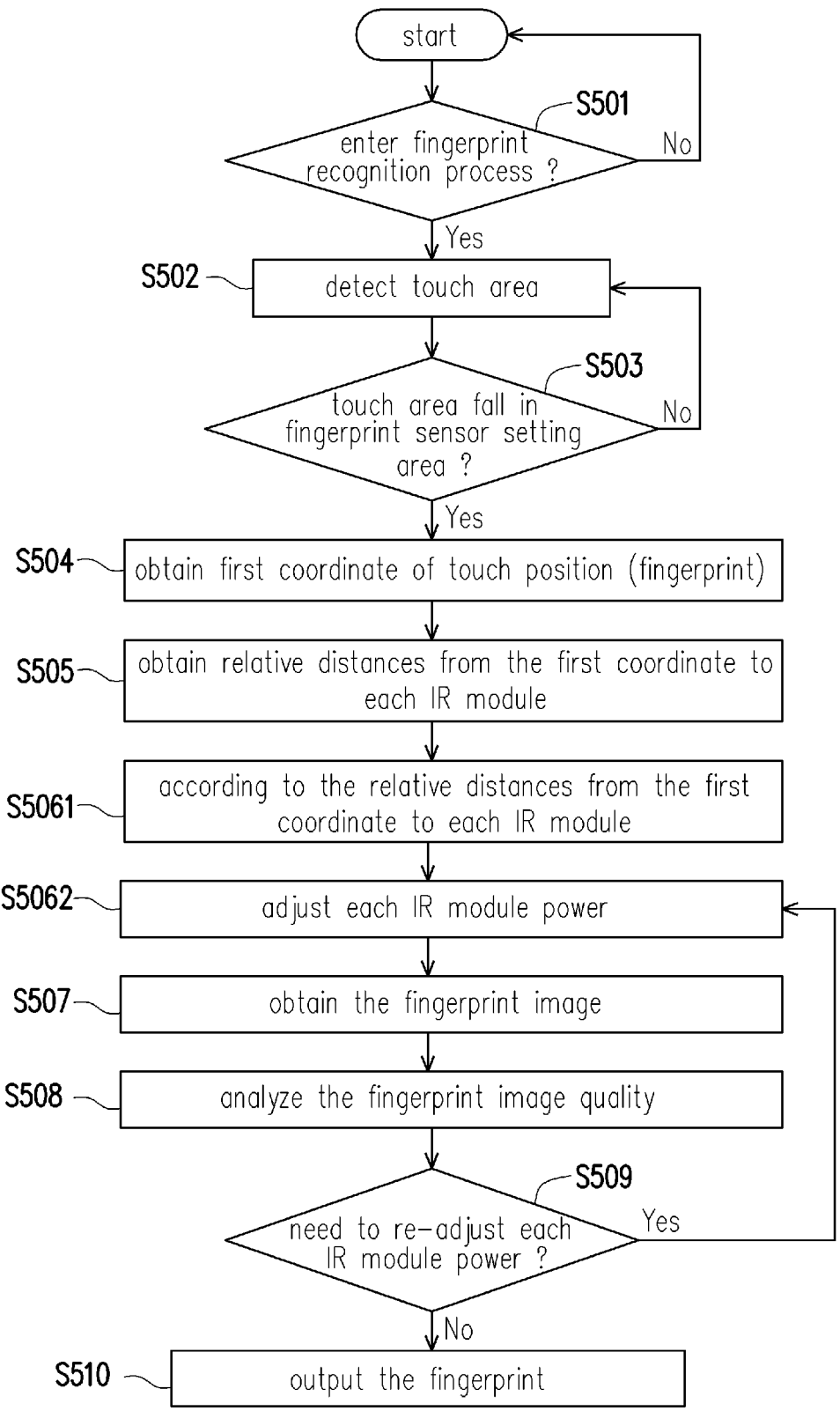
FIG. 5 is a flowchart of dynamically adjusting the power levels of each of the IR light-emitting modules according to the relative distances according to an embodiment of the disclosure.

FIG. 5 is a flowchart of dynamically adjusting the power levels of each of the IR light-emitting modules according to the relative distances according to an embodiment of the disclosure. In step S501 the fingerprint recognition apparatus 100 determines to enter a fingerprint recognition process or not. In step S502 and step S503 the touch detecting module 101 detects a touch area and determines the touch area falls in a fingerprint sensor setting area or not. In step S504 the touch detecting module 101 detects and obtains a first coordinate of the touch position (i.e. fingerprint). In step S505 the processing module 102 obtains the relative distances from the first coordinate of the fingerprint to the coordinates of each of the IR light-emitting modules on the panel. In step S5061 and S5062 the infrared power adjusting module 104 adjusts the power levels of each of the IR light-emitting modules according to the relative distances from the first coordinate of the fingerprint to the coordinates of each of the IR light-emitting modules on the panel. In step S507 the processing module 102 transmits the fingerprint capture signal to the fingerprint sensor to obtain the fingerprint image. In step S508 the processing module 102 outputs the fingerprint image to the image outputting module 103 to analyze the quality of the fingerprint image (i.e. the grayscale value). In step S509 the image outputting module 103 determines the infrared power adjusting module 104 needs to re-adjust the power levels of each of the IR light-emitting modules or not. In step S510 the image outputting module 103 outputs the fingerprint.

Figure 6:
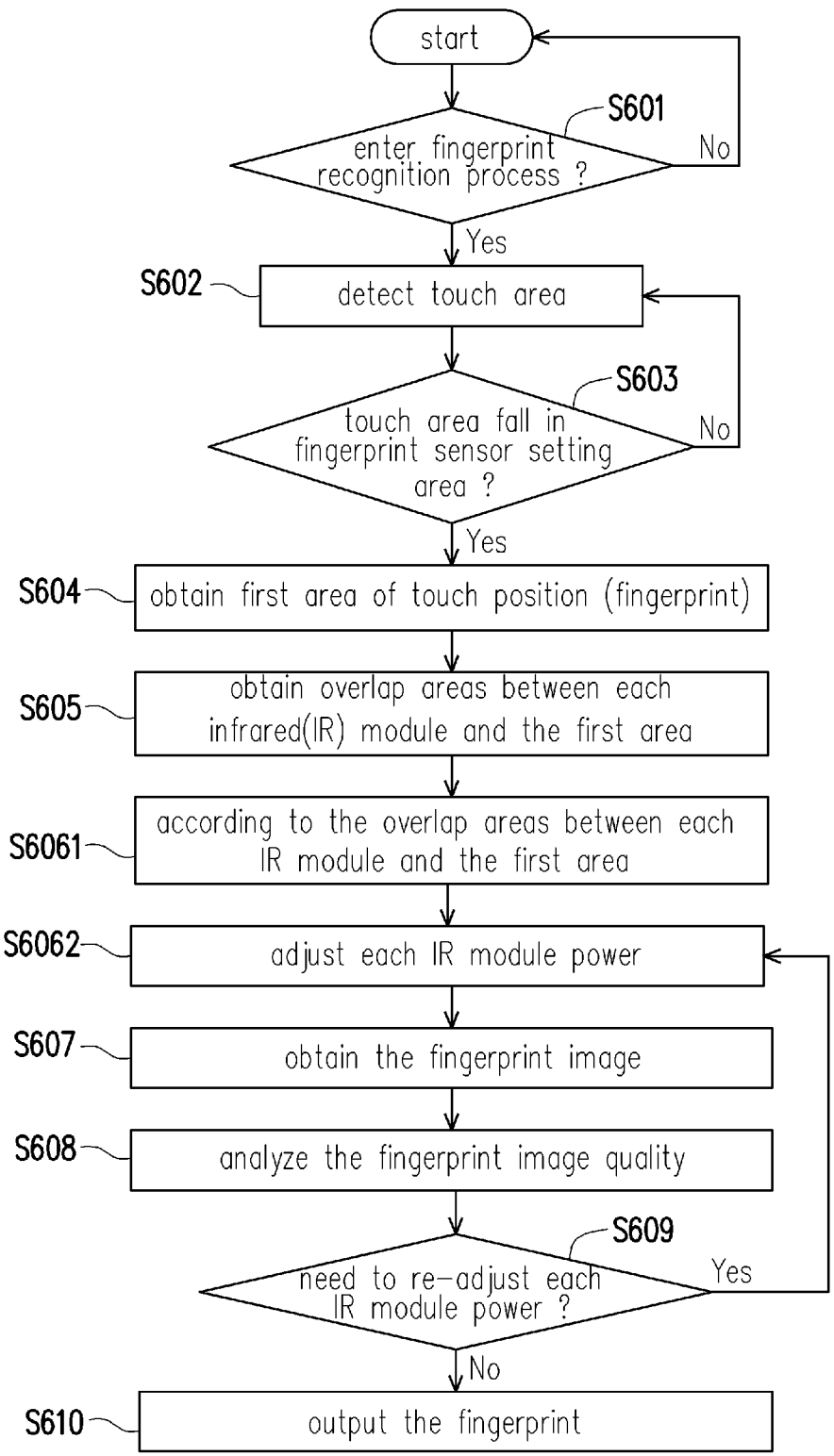
FIG. 6 is a flowchart of dynamically adjusting the power levels of each of the IR light-emitting modules according to the overlap areas according to an embodiment of the disclosure.

FIG. 6 is a flowchart of dynamically adjusting the power levels of each of the IR light-emitting modules according to the overlap areas according to an embodiment of the disclosure. In step S601 the fingerprint recognition apparatus 100 determines to enter the fingerprint recognition process or not. In step S602 and step S603 the touch detecting module 101 detects the touch area and determines the touch area falls in the fingerprint sensor setting area or not. In step S604 the touch detecting module 101 detects and obtains a first area of the touch position (i.e. fingerprint). In step S605 the processing module 102 obtains the overlap areas between the first area of the fingerprint and the areas of each of the IR light-emitting modules on the panel. In step S6061 and S6062 the infrared power adjusting module 104 adjusts the power levels of each of the IR light-emitting modules according to the overlap areas between the first area of the fingerprint and the areas of each of the IR light-emitting modules on the panel. In step S607 the processing module 102 transmits the fingerprint capture signal to the fingerprint sensor to obtain the fingerprint image. In step S608 the processing module 102 outputs the fingerprint image to the image outputting module 103 to analyze the quality of the fingerprint image (i.e. the grayscale value). In step S609 the image outputting module 103 determines the infrared power adjusting module 104 needs to re-adjust the power levels of each of the IR light-emitting modules or not. In step S610 the image outputting module 103 outputs the fingerprint.

To sum up, in the fingerprint recognition apparatus provided by the disclosure, the details of the fingerprint are kept by emitting proper power of the light from the IR light-emitting modules to the fingerprint dynamically according to the position of the fingerprint and the characteristic value of the fingerprint image and enhance the recognition rate of the fingerprint.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A fingerprint recognition apparatus for outputting a fingerprint image captured on a panel, comprising:
    a touch detector, configured to detect a touch coordinate of a finger on the panel and a touch area of the finger on the panel;
    a plurality of light-emitting modules, emitting light to the finger on the panel;
    a processor, coupling to the touch detector and the plurality of light-emitting modules,
    outputting a setting value according to whether overlap areas between the touch area and each of the plurality of light-emitting modules are equal to or greater than a threshold value,
    adjusting power levels of the plurality of light-emitting modules according to the setting value, and
    outputting the fingerprint image.

2. The fingerprint recognition apparatus as claimed in claim 1, wherein the processor outputs the setting value according to relative distances between the touch coordinate and each of the plurality of light-emitting modules.

3. The fingerprint recognition apparatus as claimed in claim 2, wherein the processor adjusts the power levels of the plurality of light-emitting modules proportional to the relative distances.

4. The fingerprint recognition apparatus as claimed in claim 1, wherein the processor adjusts the power levels of the plurality of light-emitting modules to a first power level when the overlap areas are equal to or greater than the threshold value and to a second power level when the overlap areas are less than the threshold value.

5. The fingerprint recognition apparatus as claimed in claim 4, wherein the second power level is less than the first power level.

6. The fingerprint recognition apparatus as claimed in claim 1, wherein the processor outputs the fingerprint image when a characteristic value of the fingerprint image is within a first range and outputs a re-adjust signal to the processor to update the setting value when the characteristic value of the fingerprint image is not within the first range.

7. The fingerprint recognition apparatus as claimed in claim 6, wherein the characteristic value of the fingerprint image comprises a grayscale value.

8. The fingerprint recognition apparatus as claimed in claim 1, wherein the light comprises infrared light.

9. A method adapted to a fingerprint recognition apparatus, comprising:
    detecting a touch coordinate and a touch area of a finger on a panel;
    outputting a setting value according to whether overlap areas between the touch area and each of a plurality of light-emitting modules are equal to or greater than a threshold value;
    adjusting power levels of the light-emitting modules according to the setting value; and
    obtaining a fingerprint image captured on the panel.

10. The method as claimed in claim 9, wherein outputting the setting value is according to relative distances between the touch coordinate and each of the plurality of light-emitting modules.

11. The method as claimed in claim 10, wherein adjusting the power levels of the plurality of light-emitting modules is proportional to the relative distances.

12. The method as claimed in claim 9, wherein the power levels of the plurality of light-emitting modules are adjusted to a first power level when the overlap areas are equal to or greater than the threshold value and to a second power level when the overlap areas are less than the threshold value.

13. The method as claimed in claim 12, wherein the second power level is less than the first power level.

14. The method as claimed in claim 9, wherein the fingerprint image is outputted when a characteristic value of the fingerprint image is within a first range and a re-adjust signal is outputted to update the setting value when the characteristic value of the fingerprint image is not within the first range.

15. The method as claimed in claim 14, wherein the characteristic value of the fingerprint image comprises a grayscale value.

16. The method as claimed in claim 9, wherein the light comprises infrared light.

* * * * *